(12) United States Patent
Wang

(10) Patent No.: US 9,890,808 B2
(45) Date of Patent: Feb. 13, 2018

(54) TELESCOPING PROPSHAFT

(71) Applicant: American Axle & Manufacturing, Inc., Detroit, MI (US)

(72) Inventor: Dawhorng Dennis Wang, Perrysburg, OH (US)

(73) Assignee: American Axle & Manufacturing, Inc., Detroit, MI (US)

( * ) Notice: Subject to any disclaimer, the term of this patent is extended or adjusted under 35 U.S.C. 154(b) by 131 days.

(21) Appl. No.: 15/134,617

(22) Filed: Apr. 21, 2016

(65) Prior Publication Data

US 2016/0312821 A1  Oct. 27, 2016

Related U.S. Application Data

(60) Provisional application No. 62/150,962, filed on Apr. 22, 2015.

(51) Int. Cl.
| | | |
|---|---|---|
| *F16C 3/03* | (2006.01) | |
| *F16D 3/06* | (2006.01) | |
| *F16D 3/38* | (2006.01) | |
| *F16D 3/41* | (2006.01) | |
| *F16D 3/84* | (2006.01) | |

(52) U.S. Cl.
CPC .............. *F16C 3/03* (2013.01); *F16D 3/06* (2013.01); *F16D 3/38* (2013.01); *F16D 3/387* (2013.01); *F16D 3/41* (2013.01); *F16D 3/845* (2013.01); *Y10T 403/7026* (2015.01)

(58) Field of Classification Search
CPC . F16D 3/845; F16D 3/06; F16D 3/387; F16D 3/41; F16D 3/38; Y10T 403/7026

USPC ......... 464/162; 384/29–31; 403/359.1–359.6
See application file for complete search history.

(56) References Cited

U.S. PATENT DOCUMENTS

| | | | |
|---|---|---|---|
| 2,161,138 A | * | 6/1939 | Cutting ..................... F16D 3/06 |
| 2,239,192 A | | 4/1941 | Anon |
| 3,293,884 A | | 12/1966 | Anon |
| 3,903,982 A | | 9/1975 | Van Winsen et al. |
| 4,125,000 A | | 11/1978 | Grob |
| 4,622,022 A | | 11/1986 | Diffenderfer et al. |
| 4,622,840 A | | 11/1986 | Diffenderfer et al. |

(Continued)

FOREIGN PATENT DOCUMENTS

| | | |
|---|---|---|
| DE | 4113709 A1 | 10/1992 |
| EP | 0893613 A1 | 1/1999 |
| WO | WO-2007/056726 A1 | 5/2007 |

OTHER PUBLICATIONS

PCT International Search Report and Written Opinion dated Aug. 2, 2016.

*Primary Examiner* — Gregory J Binda
(74) *Attorney, Agent, or Firm* — Harness, Dickey & Pierce, P.L.C.

(57) ABSTRACT

A propshaft with an universal joint, a first tubular member and a second tubular member. The universal joint has first and second yoke arms that are pivotally coupled to one another. The first tubular member is fixedly coupled to the first yoke arms and has a plurality of first teeth. The second tubular member slidably received over the first tubular member and includes a plurality of second teeth. The first and second teeth engage one another when the propshaft is in an extended condition. The second teeth engage the first yoke arms when the propshaft is in a retracted condition.

12 Claims, 6 Drawing Sheets

(56) References Cited

U.S. PATENT DOCUMENTS

| | | | |
|---|---|---|---|
| 4,945,745 A * | 8/1990 | Bathory | F16D 3/06 464/162 |
| 5,064,040 A * | 11/1991 | Johnson | F16D 3/06 403/359.5 X |
| 5,230,658 A | 7/1993 | Burton | |
| 5,360,377 A * | 11/1994 | Fernandez | F16C 3/03 464/162 X |
| 5,525,112 A | 6/1996 | Smith | |
| 5,566,777 A | 10/1996 | Trommer et al. | |
| 5,716,276 A | 2/1998 | Mangas et al. | |
| 5,765,419 A | 6/1998 | Krapfenbauer | |
| 5,827,122 A | 10/1998 | Kurian | |
| 5,938,534 A | 8/1999 | Kurian et al. | |
| 6,003,238 A | 12/1999 | Aiken et al. | |
| 6,015,350 A | 1/2000 | Breese | |
| 6,089,065 A | 7/2000 | Deriaz | |
| 6,368,225 B1 | 4/2002 | Breese et al. | |
| 6,371,859 B1 | 4/2002 | Gibson | |
| 6,421,616 B1 | 7/2002 | Dickson | |
| 6,425,605 B1 | 7/2002 | Cholakon et al. | |
| 6,484,384 B1 | 11/2002 | Gibson et al. | |
| 6,543,266 B1 | 4/2003 | Jaekel | |
| 6,666,772 B1 | 12/2003 | Cheney et al. | |
| 6,754,943 B1 | 6/2004 | Perry et al. | |
| 6,896,623 B2 | 5/2005 | Creek | |
| 7,007,362 B2 | 3/2006 | Gibson | |
| 7,025,686 B1 | 4/2006 | Aiken | |
| 7,080,436 B2 | 7/2006 | Durand | |
| 7,080,437 B2 | 7/2006 | da Silva et al. | |
| 7,152,708 B2 | 12/2006 | Campbell | |
| 7,207,890 B2 | 4/2007 | Lukac | |
| 7,562,549 B2 | 7/2009 | Deriaz et al. | |
| 7,591,164 B2 | 9/2009 | Duggan et al. | |
| 7,744,474 B2 | 6/2010 | Valovick | |
| 7,775,893 B2 | 8/2010 | Blumenthal | |
| 7,861,572 B2 | 1/2011 | Geser | |
| 7,874,760 B2 | 1/2011 | Steinrisser | |
| 7,955,020 B2 | 6/2011 | Deriaz | |
| 8,066,573 B2 | 11/2011 | Wagner et al. | |
| 8,087,171 B2 | 1/2012 | Fischer et al. | |
| 8,117,884 B2 | 2/2012 | Deriaz | |
| 8,186,199 B2 | 5/2012 | Wagner et al. | |
| 8,460,116 B1 | 6/2013 | Smith | |
| 8,523,689 B2 | 9/2013 | Fischer et al. | |
| 2006/0181069 A1* | 8/2006 | Yamada | |
| 2010/0113165 A1 | 5/2010 | Ledford et al. | |
| 2011/0124421 A1 | 5/2011 | Kienhofer et al. | |
| 2011/0219839 A1 | 9/2011 | Wagner et al. | |

\* cited by examiner

TELESCOPING PROPSHAFT

CROSS-REFERENCE TO RELATED APPLICATIONS

This application claims the benefit of U.S. Provisional Application No. 62/150,962, filed on Apr. 22, 2015, the disclosure of which is incorporated by reference as if fully set forth in detail herein.

FIELD

The present disclosure relates to a telescoping propshaft.

BACKGROUND

This section provides background information related to the present disclosure which is not necessarily prior art.

Propshafts for cars and trucks typically are employed to transmit rotary power from an input device, such as a transmission or a transfer case, to an output device, such as an axle assembly. Some vehicle manufacturers require that a propshaft collapse in an axial direction to a specified length upon the application of a compressive force directed along the longitudinal axis of the propshaft. Heretofore, compliance with such requirements has entailed the forming of the propshaft with two concentrically arranged tubular members having relatively long splined segments that are matingly engaged to one another. Moreover, the splined segments employ a pattern of circumferentially spaced apart teeth and valleys around the entire circumference of each tubular member. Such designs typically employ more teeth than are needed to transmit the torsional load across the tubular members, which increases the cost and complexity of the tubular members and the tooling to produce them. Moreover, the long splined segments are relatively expensive to manufacture. Consequently, there remains a need in the art for an improved telescoping propshaft.

SUMMARY

This section provides a general summary of the disclosure, and is not a comprehensive disclosure of its full scope or all of its features.

In one form, the present disclosure provides a propshaft having a first universal joint, a first tubular member and a second tubular member. The first universal joint has a first yoke, a second yoke and a cross-shaft. The first yoke has a pair of first yoke arms. The second yoke has a pair of second yoke arms. The cross-shaft has a pair of first trunnions and a pair of second trunnions. Each of the first trunnions is pivotally mounted to a corresponding one of the first yoke arms. Each of the second trunnions is pivotally mounted to a corresponding one of the second yoke arms. The first tubular member is fixedly coupled to the first yoke and has an exterior surface with a plurality of first tooth sets. Each first tooth set has one or more first teeth that extend parallel to a longitudinal axis of the first tubular member. Each adjacent pair of the first tooth sets is spaced circumferentially apart from one another by a first spacing zone. The second tubular member has an interior surface with a plurality of second tooth sets. Each second tooth set has one or more second teeth that are meshingly engaged with the one of more first teeth of an associated one of the first tooth sets when the propshaft is in an extended condition such that the second tubular member is non-rotatably but axially slidably engaged to the first tubular member. Each adjacent pair of the second tooth sets is spaced apart from one another by a second spacing zone. The first and second spacing zones cooperate to define a plurality of circumferentially spaced apart void zones. Each of the void zones being configured to receive a corresponding one of the first or second yoke arms when the second tubular member is slid over the first universal joint to receive at least a portion of the second yoke therein.

In another form, the present disclosure provides a propshaft having a first universal joint, a first tubular member and a second tubular member. The first universal joint has a first yoke, a second yoke and a cross-shaft. The first yoke has a pair of first yoke arms. The second yoke has a pair of second yoke arms. The cross-shaft has a pair of first trunnions and a pair of second trunnions. Each of the first trunnions is pivotally mounted to a corresponding one of the first yoke arms. Each of the second trunnions is pivotally mounted to a corresponding one of the second yoke arms. The first tubular member is fixedly coupled to the first yoke and has an exterior surface with a plurality of first teeth. The second tubular member is slidably received over the first tubular member and has an interior surface with a plurality of second teeth. The first and second tubular members are positionable in an extended condition in which the propshaft has a first length and the first and second teeth are engaged to one another such that the first tubular member is rotatably coupled to the second tubular member. The first and second tubular members are also positionable in a retracted condition in which the propshaft has a second length that is shorter than the first length and the second teeth are engaged to the first yoke arms to rotatably couple the second tubular member to the first yoke.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
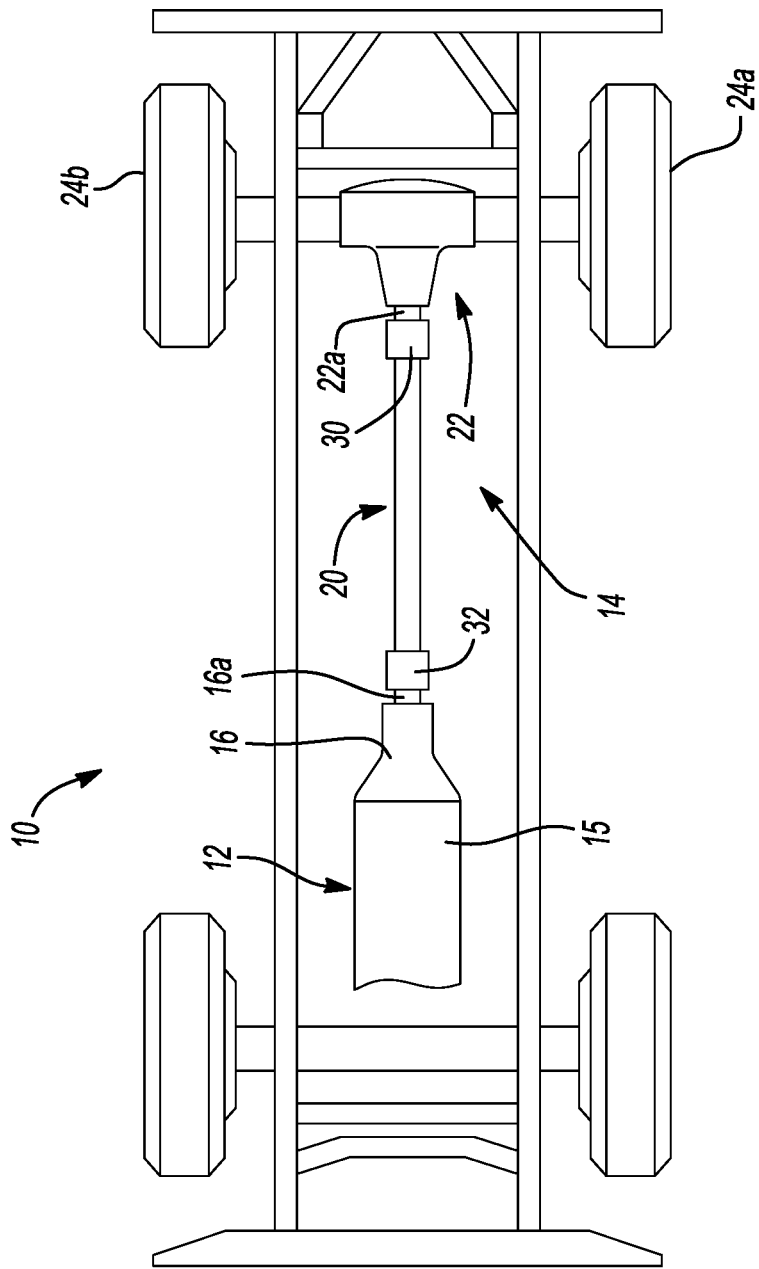
FIG. 1 is a schematic illustration of a vehicle having an propshaft constructed in accordance with the teachings of the present disclosure.

With reference to FIG. 1, a vehicle having a propshaft constructed in accordance with the teachings of the present disclosure is schematically illustrated. The vehicle 10 includes a power train 12 and a drivetrain 14. The power train 12 can include a power source, such as an internal combustion engine 15, and a transmission 16 that can cooperate to provide rotary power to the drivetrain 14. The drivetrain 14 can include a propshaft 20 and an axle assembly 22 that cooperate to transmit rotary power to a pair of drive wheels 24a, 24b. The powertrain 12 and the axle assembly 22 can be conventional in their construction and operation and as such, a detailed discussion of these components need not be provided herein. The propshaft 20 is configured to transmit rotary power between an output shaft 16a of the transmission 16 and an input pinion shaft 22a of the axle assembly 22.

Figure 2:
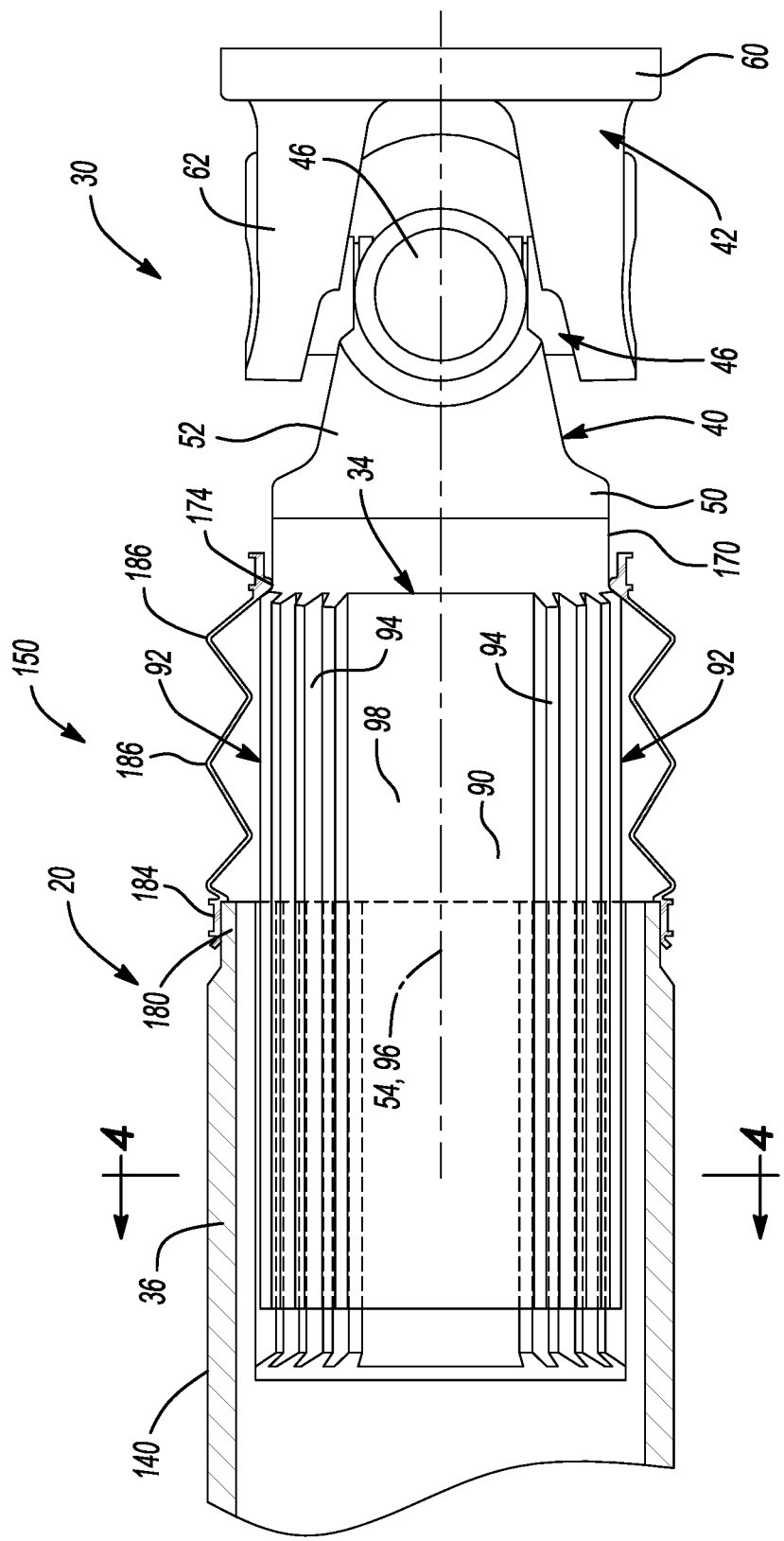
FIG. 2 is a perspective, partly sectioned view of the propshaft of FIG. 1, the view depicting the propshaft in an extended condition.

With additional reference to FIG. 2, the propshaft 20 can include a first universal joint 30, a second universal joint 32, a first tubular member 34 and a second tubular member 36. The first and second universal joints 30 and 32 are generally similar and as such a discussion of the first universal joint 30 will suffice for both.

Figure 3:
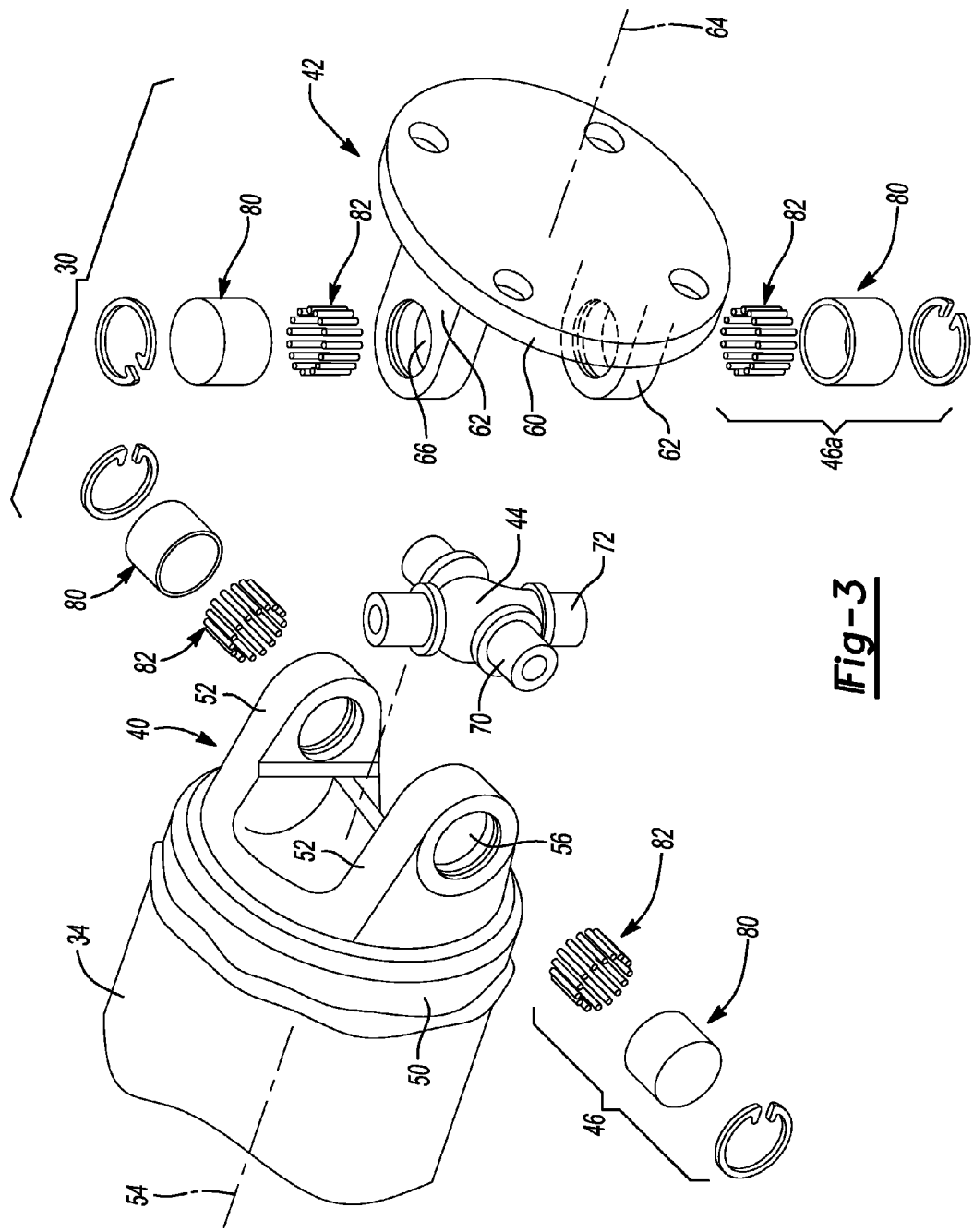
FIG. 3 is an exploded perspective view of a portion of the propshaft of FIG. 1, illustrating a first universal joint in more detail.

With reference to FIGS. 2 and 3, the first universal joint 30 can have a first yoke 40, a second yoke 42, a cross-shaft 44 and a plurality of bearing assemblies 46. The first yoke 40 can have a first flange member 50 and a pair of first yoke arms 52 that extend from the first flange member 50. The first flange member 50 is configured to be fixedly coupled to the first tubular member 34 in a desired manner, such as friction welding. The first yoke arms 52 are spaced 180 degrees apart from one another around a rotational axis 54 of the first yoke 40. Each of the first yoke arms 52 defines a bore 56 that is configured to receive an associated one of the bearings assemblies 46 therein. The second yoke 42 can have a second flange member 60 and a pair of second yoke arms 62 that extend from the second flange member 60. The second flange member 60 is configured to be axially and non-rotatably coupled to one of the output shaft 16a (FIG. 1) and the input pinion shaft 22a (FIG. 1) in a desired manner, such as with a plurality of bolts (not shown). The second yoke arms 62 are spaced 180 degrees apart from one another around a rotational axis 64 of the second yoke 42. Each of the second yoke arms 62 defines a bore 66 that is configured to receive an associated one of the bearing assemblies 46 therein. The cross-shaft 44 defines a pair of first trunnions 70, which are received into the bores 56 in the first yoke arms 52, and a pair of second trunnions 72 that are received into the bores 66 of the second yoke arms 62. Each of the bearing assemblies 46 comprises a bearing cup 80, which is engaged to a corresponding one of the first and second yoke arms 52 and 62, and a plurality of rollers 82 that are disposed between the bearing cup 80 and a corresponding one of the first and second trunnions 70 and 72. Accordingly, it will be appreciated that each of the first trunnions 70 is pivotally mounted to a corresponding one of the first yoke arms 52 and that each of the second trunnions 72 is pivotally mounted to a corresponding one of the second yoke arms 62.

Figure 4:
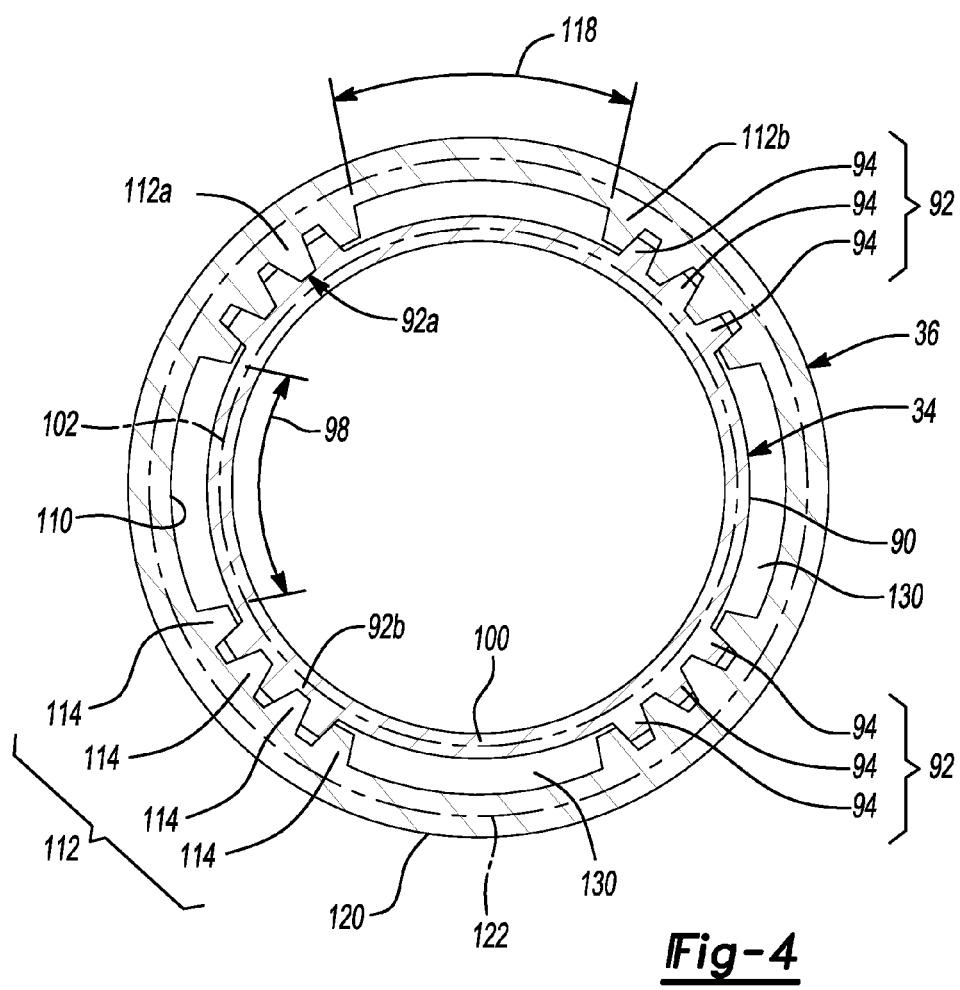
FIG. 4 is a sectional view taken along the line 4-4 of FIG. 2.

With reference to FIGS. 2 and 4, the first tubular member 34 is fixedly coupled to the first yoke 40, such as by friction welding the first flange member 50 to an axial end of the first tubular member 34. The first tubular member 34 can have an exterior surface 90 with a plurality of first tooth sets 92. Each first tooth set 92 has one or more circumferentially spaced apart first teeth 94 that extend parallel to a longitudinal axis 96 of the first tubular member 34. Each adjacent pair of the first tooth sets 92 (e.g., first tooth set 92a and first tooth set 92b) is spaced circumferentially apart from one another by a first spacing zone 98. The first tubular member 34 can be an extrusion having a wall member 100 that is centered on a first base circle 102 such that the portions of the first tubular member 34 that define the first spacing zones 98 are centered concentrically about the first base circle 102. In the example provided, the first teeth 94 define a major diameter that is larger than a diameter of the first base circle 102.

The second tubular member 36 can have an interior surface 110 with a plurality of second tooth sets 112. Each second tooth set 112 can have one or more second teeth 114 that are meshingly engaged with the first teeth 94 of an associated one of the first tooth sets 92 when the propshaft 20 is in an extended condition such that the second tubular member 36 is non-rotatably but axially slidably engaged to the first tubular member 34. Each adjacent pair of the second tooth sets 112 (e.g., second tooth set 112a and second tooth set 112b) is spaced apart from one another by a second spacing zone 118. The second tubular member 36 can be an extrusion, a machined (e.g., broached) collar, or a cold formed tubular segment that can have a wall member 120 that is centered on a second base circle 122 such that the portions of the second tubular member 36 that define the second spacing zones 118 are centered concentrically about the second base circle 122. In the example provided, the second teeth 114 define a minor diameter that is smaller than a diameter of the second base circle 122.

The first and second spacing zones 98 and 118 can cooperate to define a plurality of circumferentially spaced apart void zones 130. Each of the void zones 130 is configured to receive a corresponding one of the first yoke arms 52 or second yoke arms 62 when the second tubular member 36 is slid over the first universal joint 30 to receive at least a portion of the second yoke 42 therein.

The second universal joint 32 (FIG. 1) can be coupled to the second tubular member 36 for rotation therewith. In the particular example provided, the second tubular member 36 is fixedly coupled to a first end of a third tubular member 140 and the second universal joint 32 (FIG. 1) is mounted to a second, opposite end of the third tubular member 140.

The first and second tooth sets 92 and 112 can be configured with overlapping lengths so that the propshaft 20, and more specifically the first and second tubular members 34 and 36 can be positioned in a range of working positions in which a desired amount of rotary power is capable of being transmitted through the propshaft 20. This range of working positions includes a first position in which the propshaft 20, and more specifically the first and second tubular members 34 and 36, are positioned in the (fully) extended condition (shown in FIG. 2) in which the propshaft 20 has a first (overall) length and the first and second teeth 94 and 114 are engaged to one another such that the first tubular member 34 is rotatably coupled to the second tubular member 36. This range of positions also includes a second position in which the propshaft 20, and more specifically the first and second tubular members 34 and 36, are positioned in a somewhat retracted condition in which the propshaft 20 has a second (overall) length that is shorter than the first overall length and the first and second teeth 94 and 114 are engaged to one another such that the first tubular member 34 is rotatably coupled to the second tubular member 36.

Figure 5:
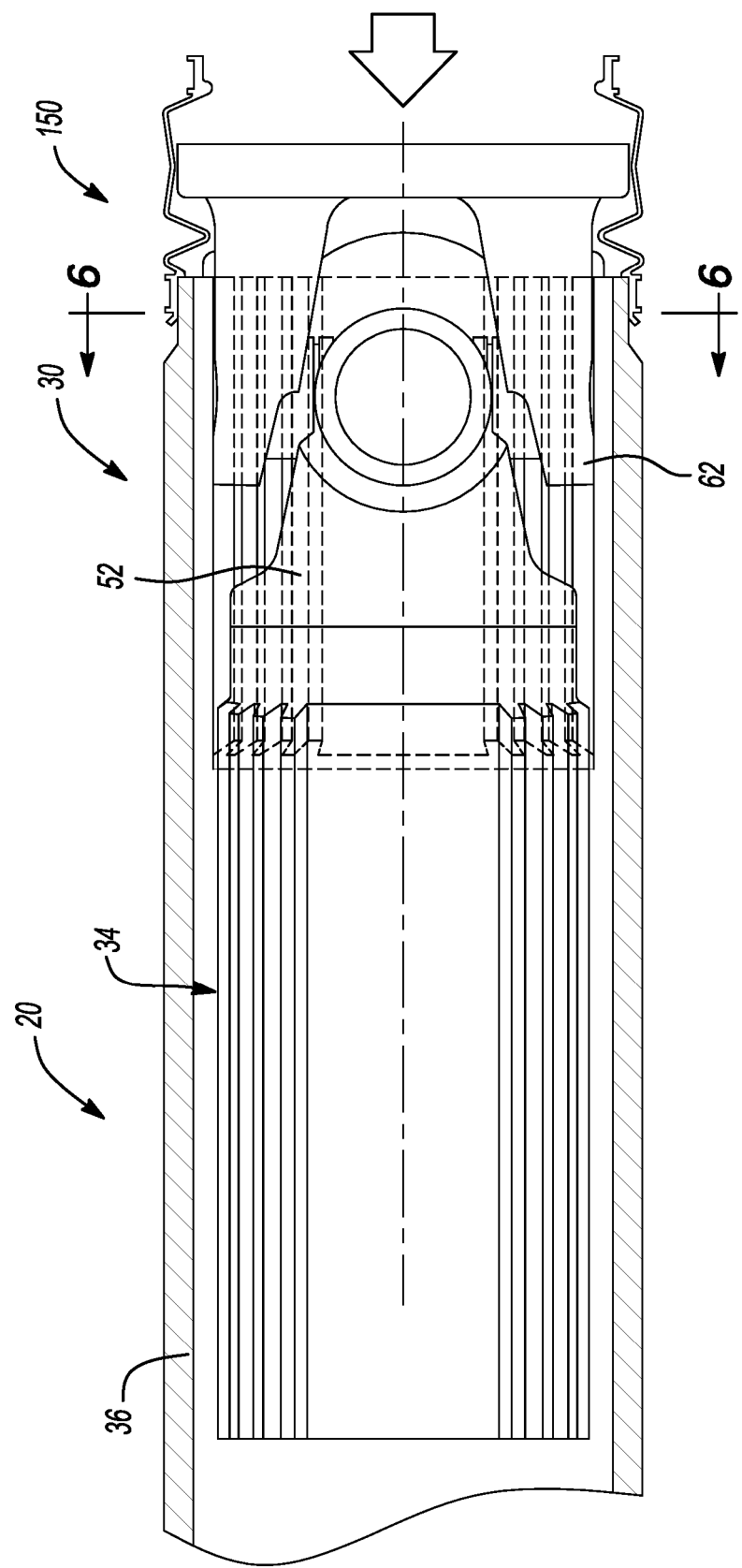
FIG. 5 is a view similar to that of FIG. 2 but depicting the propshaft in a retracted condition.
Figure 6:
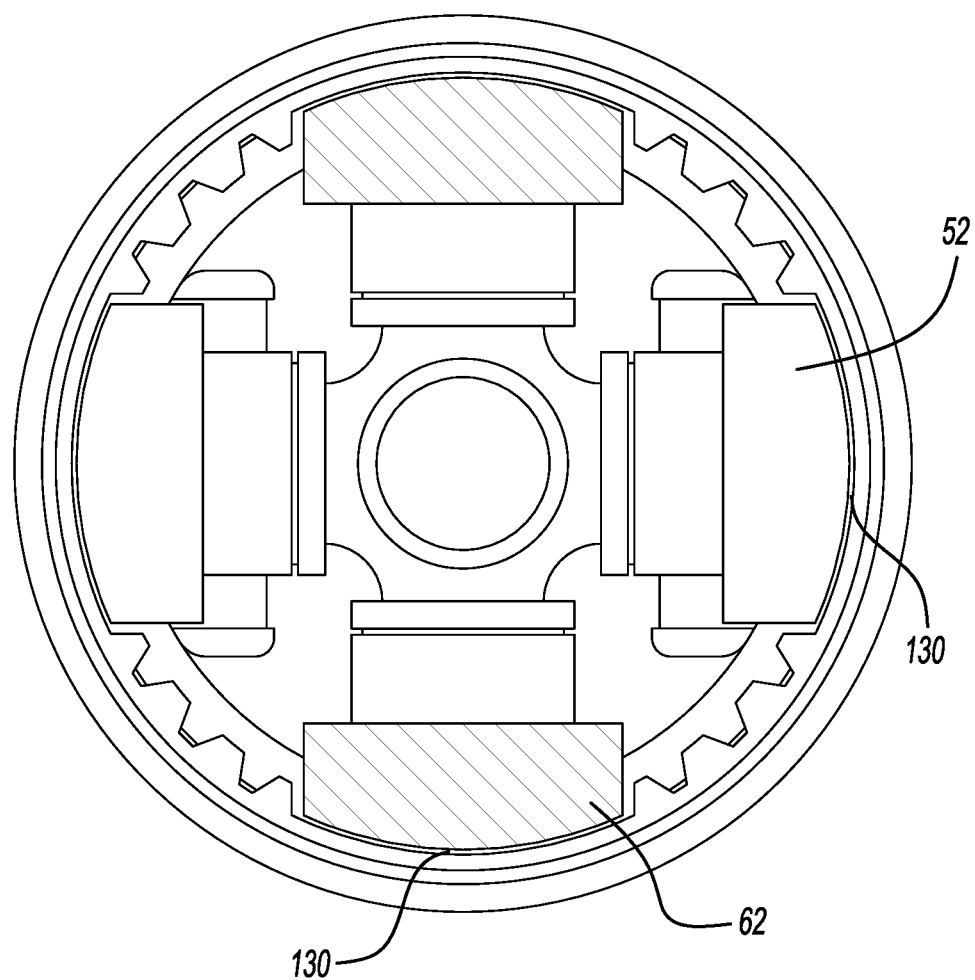
FIG. 6 is a section view taken along the line 6-6 of FIG. 5.

With reference to FIGS. 5 and 6, the first and second tooth sets 92 and 112 can be configured such that when the propshaft 20 and more specifically, the first and second tubular members 34 and 36, are positioned in a retracted condition, the propshaft 20 has a third (overall) length that is shorter than the second (overall) length, the first yoke arms 52 are received into a first pair of the void spaces 130 and the second teeth 114 are engaged to the first yoke arms 52 to rotatably couple the second tubular member 36 to the first yoke 40. In the particular example provided, the second yoke arms 62 are received into a second pair of the void spaces 130, the second teeth 114 engage the second yoke arms 62 and the second teeth 114 are disengaged from the first teeth 94 when the propshaft 20 is in the retracted condition. It will be appreciated from the foregoing that since void spaces 130 are positioned to receive the first and second yoke arms 52 and 62 and since both the first and second yoke arms 52 and 62 are received into the second tubular member 36 when the first and second tubular members 34 and 36 are in the retracted condition, void spaces 130 are positioned to receive the cross-shaft 44 and the cross-shaft 44 is also received into the second tubular member 36 when the first and second tubular members 34 and 36 are in the retracted position.

Configured in this manner, the second teeth 114 can be relatively short compared to the length of the first teeth 94. In the example provided, the second teeth 114 have a length that is about one-half of the length of the first teeth 94.

With renewed reference to FIG. 2, the propshaft 20 can further include a seal 150 that is mounted to the first and second tubular members 34 and 36. The seal 150 can be configured to inhibit the ingress of dirt, debris and moisture between the first and second tubular members 34 and 36 while permitting relative axial movement between the first and second tubular members 34 and 36. The first tubular member 34 can have a neck portion 170 over which the at least one first teeth 94 do not extend. The first flange 50 of the first yoke 40 can be mounted to the neck portion 170. The seal 150 can have a first mount 174 that can be mounted to the neck portion 170. The second tubular member 36 can have a necked down portion 180 on which a second mount 184 of the seal 150 can be mounted. The seal 150 can include a plurality of convolutions 186 that can extend between the first and second mounts 174 and 184.

The propshaft 20 can be installed into a vehicle driveline such that its overall length can be between the first and second overall lengths. In a situation where it would be desirable for the propshaft 20 to assume a shorter overall length, the second tubular member 36 can telescope or slide over the first tubular member 34 even to a point at which the first and second yoke arms 52 and 62 are received into the second tubular member 36, which significantly shortens the overall length of the propshaft 20. It will be appreciated that relative movement of the second tubular member 36 toward the first tubular member 34 as the two tubular members are being positioned in the retracted position causes the second tubular member 36 to disengage the seal 150 from the first tubular member 34 as shown in FIG. 5.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A propshaft comprising:
    a first universal joint having a first yoke, a second yoke and a cross-shaft, the first yoke having a pair of first yoke arms, the second yoke having a pair of second yoke arms, the cross-shaft having a pair of first trunnions and a pair of second trunnions, each of the first trunnions being pivotally mounted to a corresponding one of the first yoke arms, each of the second trunnions being pivotally mounted to a corresponding one of the second yoke arms;
    a first tubular member fixedly coupled to the first yoke, the first tubular member having an exterior surface with a plurality of first tooth sets, each first tooth set having one or more first teeth that extend parallel to a longitudinal axis of the first tubular member, each adjacent pair of the first tooth sets being spaced circumferentially apart from one another by a first spacing zone; and
    a second tubular member having an interior surface with a plurality of second tooth sets, each second tooth set having one or more second teeth that are meshingly engaged with the one or more first teeth of an associated one of the first tooth sets when the propshaft is in an extended condition such that the second tubular member is non-rotatably but axially slidably engaged to the first tubular member, each adjacent pair of the second tooth sets being spaced apart from one another by a second spacing zone, the first and second spacing zones cooperating to define a plurality of circumferentially spaced apart void zones, each of the void zones being configured to receive a corresponding one of the first or second yoke arms when the second tubular member is slid over the first universal joint to receive at least a portion of the second yoke therein.

2. The propshaft of claim 1, wherein the portions of the first tubular member that define the first spacing zones are centered concentrically about a base circle and wherein the one or more first teeth define a major diameter that is larger than a diameter of the base circle.

3. The propshaft of claim 1, wherein portions of the second tubular member that define the second spacing zones are centered concentrically about a base circle and wherein the one or more second teeth define a minor diameter that is smaller than a diameter of the base circle.

4. The propshaft of claim 1, further comprising a second universal joint coupled to the second tubular member for rotation therewith.

5. The propshaft of claim 4, wherein the second tubular member is fixedly coupled to a first end of a third tubular member and wherein the second universal joint is mounted to a second, opposite end of the third tubular member.

6. The propshaft of claim 1, wherein the one or more first teeth are disengaged from the one or more second teeth when the second yoke arms are received into an associated pair of the void spaces.

7. The propshaft of claim 1, further comprising a seal mounted to the first and second tubular members.

8. The propshaft of claim 7, wherein the first tubular member has a neck portion over which the at least one first teeth do not extend, wherein the first yoke is mounted to the neck portion and wherein the seal is mounted to the neck portion.

9. The propshaft of claim 7, wherein the second tubular member has a necked down portion on which the seal is mounted.

10. The propshaft of claim 1, wherein the at least one second teeth have a length that is shorter than the length of the at least one first teeth.

11. The propshaft of claim 10, wherein the length of the at least one second teeth is about one-half of the length of the at least one first teeth.

12. A propshaft comprising:
a first universal joint having a first yoke, a second yoke and a cross-shaft, the first yoke having a pair of first yoke arms, the second yoke having a pair of second yoke arms, the cross-shaft having a pair of first trunnions and a pair of second trunnions, each of the first trunnions being pivotally mounted to a corresponding one of the first yoke arms, each of the second trunnions being pivotally mounted to a corresponding one of the second yoke arms;
a first tubular member fixedly coupled to the first yoke, the first tubular member having an exterior surface with a plurality of first teeth; and
a second tubular member slidably received over the first tubular member, the second tubular member having an interior surface with a plurality of second teeth;
wherein the first and second tubular members are positionable in an extended condition in which the propshaft has a first length and the first and second teeth are engaged to one another such that the first tubular member is rotatably coupled to the second tubular member; and
wherein the first and second tubular members are positionable in a retracted condition in which the propshaft has a second length that is shorter than the first length and the second teeth are engaged to the first yoke arms to rotatably couple the second tubular member to the first yoke.

* * * * *